US012578560B2

(12) United States Patent
Brüning et al.

(10) Patent No.: US 12,578,560 B2
(45) Date of Patent: Mar. 17, 2026

(54) CAMERA SYSTEM FOR GENERATING A GAPLESS OPTICAL IMAGE

(71) Applicant: Fraunhofer-Gesellschaft zur Förderung der angewandten Forschung e.V., Munich (DE)

(72) Inventors: Robert Brüning, Jena (DE); Christin Gassner, Jena (DE); Britta Satzer, Jena (DE); Alexander Oberdörster, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 127 days.

(21) Appl. No.: 18/469,308

(22) Filed: Sep. 18, 2023

(65) Prior Publication Data

US 2024/0004170 A1      Jan. 4, 2024

Related U.S. Application Data

(63) Continuation of application No. PCT/EP2022/057223, filed on Mar. 18, 2022.

(30) Foreign Application Priority Data

Mar. 19, 2021      (DE) .......................... 102021202719.9

(51) Int. Cl.
$G02B\ 13/06$      (2006.01)
$G02B\ 1/10$      (2015.01)
(Continued)

(52) U.S. Cl.
CPC .............. $G02B\ 13/06$ (2013.01); $G02B\ 1/10$ (2013.01); $G02B\ 17/006$ (2013.01); (Continued)

(58) Field of Classification Search
CPC ........ G02B 13/06; G02B 1/10; G02B 17/006; H04N 23/58; H04N 23/55
See application file for complete search history.

(56) References Cited

U.S. PATENT DOCUMENTS 11,106,047 B2      8/2021  Wippermann et al.
2017/0153459 A1      6/2017  Chang et al.
(Continued)

FOREIGN PATENT DOCUMENTS

DE      102016200287 A1      7/2017
DE      102016208210 A1      11/2017
(Continued)

*Primary Examiner* — On S Mung
(74) *Attorney, Agent, or Firm* — Bridgeway IP Law Group, PLLC; Jihun Kim

(57)      ABSTRACT

Camera system, comprising: a rectangular image sensor, a multi-aperture objective for generating an optical image and a beam deflection element arrangement including a number of beam deflection elements for deflecting incident light beams, wherein the multi-aperture objective and the beam deflection arrangement are coupled to the rectangular image sensor to form an arrangement of optical channels, which are incident on the image sensor for capturing the optical image, wherein the number of beam deflection elements are arranged with respect to each other and with respect to the image sensor such that each beam deflection element is tilted around a tilting axis, wherein the tilting axis runs through a beam deflection element area and the tilting axis runs in parallel to one side of the rectangular image sensor or the tilting axis encloses a 45° angle with one side of two sides of the image sensor.

23 Claims, 7 Drawing Sheets

(51) Int. Cl.

| | | |
|---|---|---|
| *G02B 17/00* | (2006.01) | |
| *G02B 26/08* | (2006.01) | |
| *H04N 23/55* | (2023.01) | |
| *H04N 23/58* | (2023.01) | |

(52) U.S. Cl.

CPC ..... *G02B 26/0808* (2013.01); *G02B 26/0816* (2013.01); *H04N 23/55* (2023.01); *H04N 23/58* (2023.01)

(56) References Cited

U.S. PATENT DOCUMENTS

| | | |
|---|---|---|
| 2018/0324334 A1 | 11/2018 | Wippermann et al. |
| 2019/0068950 A1 | 2/2019 | Wippermann et al. |

FOREIGN PATENT DOCUMENTS

| | | | |
|---|---|---|---|
| DE | 102017208709 B3 | 10/2018 | |
| EP | 3166304 A1 | 5/2017 | |

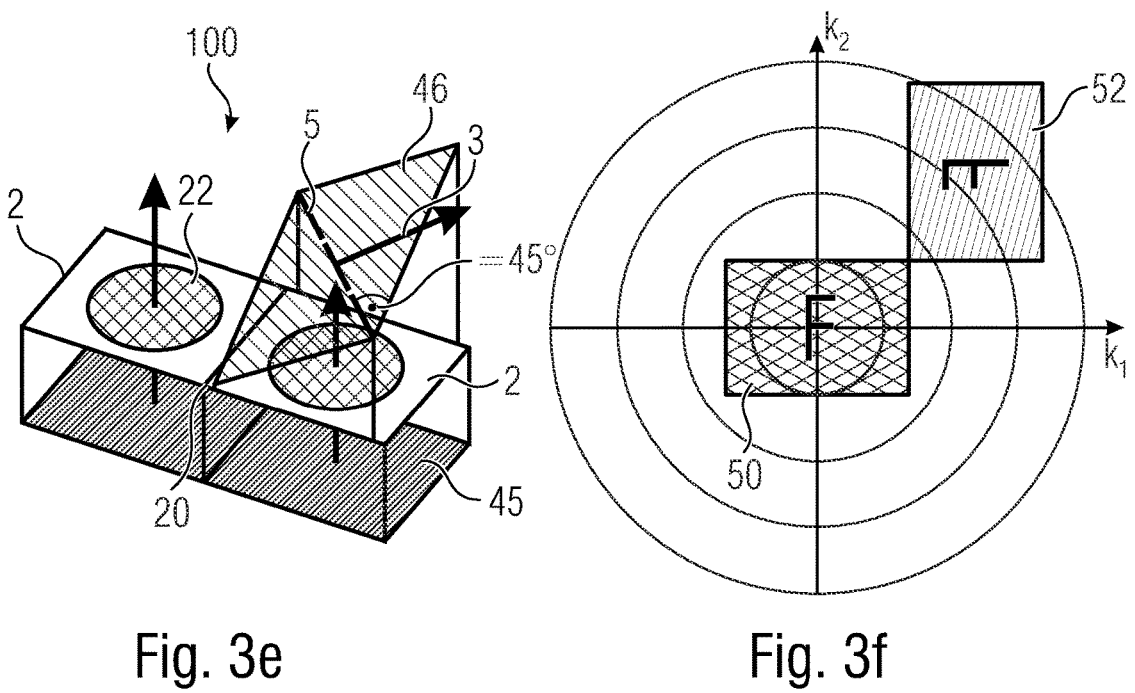
Fig. 3e
Fig. 3f
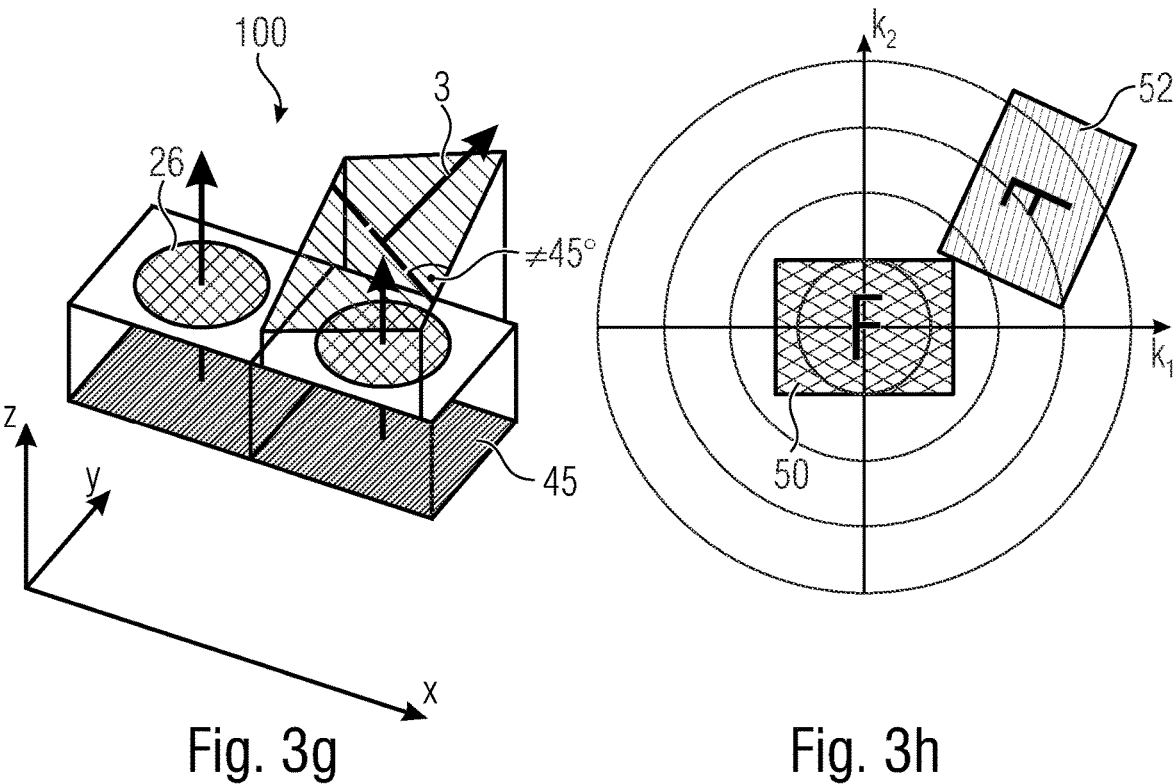
Fig. 3g
Fig. 3h

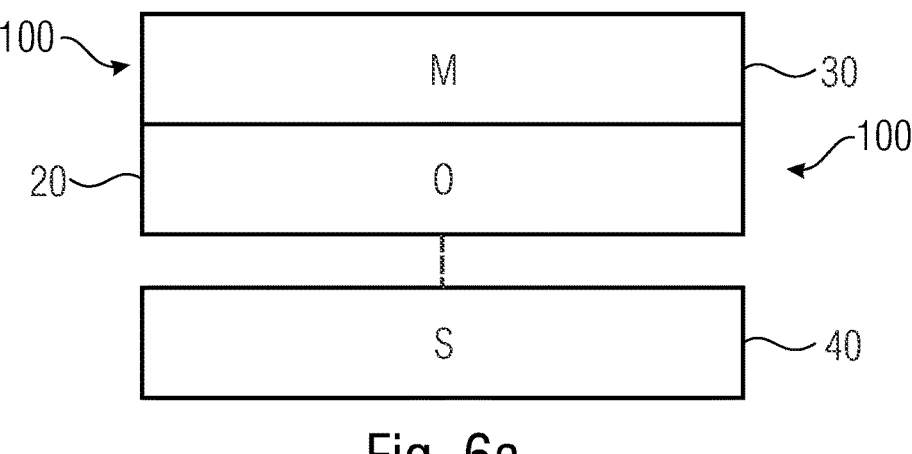
Fig. 6a
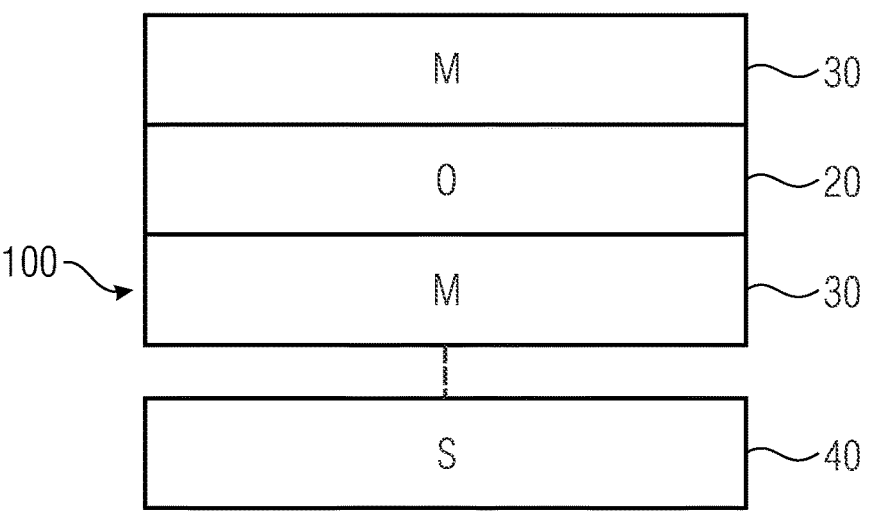
Fig. 6b
Fig. 6c

CAMERA SYSTEM FOR GENERATING A GAPLESS OPTICAL IMAGE

CROSS-REFERENCE TO RELATED APPLICATIONS

This application is a continuation of copending International Application No. PCT/EP2022/057223, filed Mar. 18, 2022, which is incorporated herein by reference in its entirety, and additionally claims priority from German Application No. 102021202719.9, filed Mar. 19, 2021, which is also incorporated herein by reference in its entirety.

The present invention relates to a camera system for generating a gapless optical image.

BACKGROUND OF THE INVENTION

Multi-aperture optics can generate a sharp bright and low-distortion picture of large fields of view by segmenting the field of view. For very large fields of view (> approximately 150°), beam deflection is needed. Beam deflection takes place in three-dimensional space in at least one plane. This has generally the effect that the partial fields of view cannot be joined without greater overlap when joining the same to a single field of view. Rather, the individual partial fields of view are rotated with respect to each other, which results in overlaps and/or gaps when joining.

The projection of very large fields of view (> approximately 150°) onto an image sensor is only possible with reasonable material effort when tradeoffs regarding luminosity, sharpness and/or geometrical distortion are accepted.

In multi-aperture systems with a very large field of view, a beam deflection element has to be used for the needed large beam deflection. This results in a geometric constructive problem where gaps or overlaps result in the field of view. Gaps correspond, for example to unused regions on the image sensor. This is not desirable for economic reasons.

SUMMARY

According to an embodiment, a camera system may have: at least one rectangular image sensor, a multi-aperture objective for generating an optical image and a beam deflection element arrangement including a number of beam deflection elements for deflecting incident light beams, wherein the multi-aperture objective and the beam deflection arrangement are coupled to the at least one rectangular image sensor to form an arrangement of optical channels, which are incident on the at least one image sensor for capturing the optical image, wherein the number of beam deflection elements are arranged with respect to each other and with respect to the at least one image sensor such that each beam deflection element is tilted around a tilting axis, wherein the tilting axis runs through a beam deflection element area and the tilting axis runs in parallel to one side of the at least one rectangular image sensor or the tilting axis encloses a 45° angle with at least one side of two sides of the at least one rectangular image sensor.

According to another embodiment, a camera system may have: at least one rectangular image sensor, a multi-aperture objective for generating an optical image and a beam deflection element arrangement including a number of beam deflection elements for deflecting incident light beams, wherein the multi-aperture objective and the beam deflection arrangement are coupled to the at least one rectangular image sensor to form an arrangement of optical channels, which are incident on the at least one image sensor for capturing the optical image, wherein two optical channels have different viewing directions and therefore two fields of view that are rotated and/or displaced with respect to each other, wherein one partial field of view of the partial fields of view results from an objective without deflection element and another partial field of view of the partial fields of view looking into a lateral viewing direction from an objective and a deflection element with image sensor, wherein the number of beam deflection elements is arranged with respect to each other and with respect to the at least one image sensor such that each beam deflection element is tilted around a tilting axis, wherein the tilting axis runs through a beam deflection element area and the tilting axis runs in parallel to one side of the at least one rectangular image sensor or the tilting axis encloses a 45° angle with at least one side of two sides of the least one rectangular image sensor, such that gaps or overlaps are prevented when joining a large total field of view from several partial fields of view.

The core idea of the present invention is to prevent gaps in the field of view or unused areas on a used image sensor. It has been found that an optimum arrangement of the imaging elements with respect to the image sensor or with respect to several image sensors and with respect to each other exists, wherein the partial fields of view connect ideally to one another and join into a large total field of view without significant overlap. For preventing gaps in the field of view or unused areas on a used image sensor, it has been found that all mirror axes, also called tilting axes herein, are to be selected such that the same run in parallel with respect to an edge of an image sensor area. It is further advantageous when the tilting axes are spaced apart in parallel to an image sensor area of the at least one image sensor.

The suggested camera system includes at least one rectangular image sensor, a multi-aperture objective for generating an optical image and a beam deflection element arrangement. The beam deflection element arrangement comprises a plurality of beam deflection elements for deflecting incident light beams. It is obvious for a person skilled in the art that here also other electromagnetic beams, i.e., not only light beams of visible light can be detected with the suggested camera system. Thus, here, light beams also mean electromagnetic beams of other wavelength ranges. The beam deflection elements can be implemented by mirrors and/or prisms. In other words, a beam deflection element can be a mirror or a prism or a combination of mirror and prism. The multi-aperture objective and the beam deflection arrangement are coupled to the at least one rectangular image sensor to form an arrangement of optical channels that are incident on the at least one image sensor for capturing the optical image.

In the suggested camera system, two optical channels have different viewing directions and therefore two fields of view that are rotated and/or displaced with respect to each other, wherein one partial field of view of the partial fields of view results by an objective without deflection element and another partial field of view of the partial fields of view looking in a lateral viewing direction results by an objective and a deflection element with image sensor.

In the suggested camera system, a single image sensor or a plurality of several image sensors can be provided. Here, it can be advantageous when the image sensors are rectangular, wherein rectangular can also mean square. For example, the side lengths of two image sensors can be different. The number of beam deflection elements is arranged with respect to each other and with respect to the at least one image sensor, such that each beam deflection element is tilted around a tilting axis. A tilting axis can be a mirror axis, which is characterized in that light beams that are incident on a beam deflection element are deflected into a specific optical channel, such that the light beams are incident on a predetermined, in particular rectangular area of an image sensor area of the at least one image sensor. The titling axis runs through a beam deflection element area, i.e., through a plane of the beam deflection element. The tilting axis runs on an external area of the beam deflection element. In other words, a beam deflection element comprises external areas, wherein at least one of these, in particular planar, areas forms the beam deflection element area. It is further possible to place a different area of the beam deflection element such that this other area defines the beam deflection element area. Additionally, it is possible that such a placing is enabled by a user. It is also possible that the tilting axis is actually an axis around which a mirror can be rotated to select the deflection. Here, it should be noted that the tilting axes as used in the present application are only conceptual auxiliary means for understanding or designing and are not necessarily actually existing rotatable axis in the finished structure, but can of course also be the same.

The tilting axis runs parallel to one side of the at least one rectangular image sensor (Option A) or the tilting axis encloses, with at least one side of two sides of the at least one rectangular image sensor, in particular spanning an image sensor area of the at least one rectangular image sensor a 45° angle (Option B). When fulfilling the condition of Option A, the field of view does not rotate in the object space. The field of view is displaced and/or mirrored by tilting at the tilting axis only in one direction, namely above or below or to the side of the image sensor area in the object space. The corners of the desired total field of view in the object space cannot be reached by fulfilling Option A. When fulfilling the condition of Option B, i.e., when the mirror axis or tilting axis runs at an angle of 45° (degree) to at least one side of the at least one rectangular image sensor, the field of view is rotated in the object space by 90° (degree). Additionally, as in Option A, displacement takes place. The sides of the rotated, in particular rectangular field of view therefore run parallel to the displaced fields of view or the displaced field of view according to Option A. Here it has been found that, when the tilting axis runs in a different angle to the sides of the rectangular image sensor, gaps or overlaps result in the fields of view. Thus, with the suggested camera system, a gapless field of view can be captured, i.e., the entire area of the image sensor can be used to capture the image.

The tilting axis runs in parallel, in particular spaced apart to the image sensor area. Due to the fact that the tilting axis runs, one the hand, parallel to one side of the at least one rectangular image sensors (Option A fulfilled) or at a 45° angle to this side of the at least one rectangular image sensor (Option B fulfilled) and, on the other hand, runs parallel to the image sensor area, a two dimensional tilting angle is defined in the three-dimensional space, which results in a gapless field of view with a total field of view >90°.

According to a further aspect, a camera system is suggested, comprising: at least one rectangular image sensor, a multi-aperture objective for generating an optical image and a beam deflection element arrangement including a plurality of beam deflection elements for deflecting incident light beams, wherein the multi-aperture objective and the beam deflection arrangement are coupled to the at least one rectangular image sensor to form an arrangement of optical channels that are incident on the at least one image sensor for capturing the optical image, wherein the number of beam deflection elements are arranged with respect to each other and with respect to the at least one image sensor such that each beam deflection element is tilted around a tilting axis, wherein the tilting axis runs through a beam deflection element area and the tilting axis runs parallel to one side of the at least one rectangular image sensor or the titling axis encloses a 45° angle with at least one side of two sides of the at least one rectangular image sensor, wherein the same comprises two beam deflection arrangements, wherein the two beam deflection arrangements enclose the multi-aperture objective from both sides, wherein one of the two beam deflection arrangements is attached to the at least one image sensor.

The at least one image sensor described herein can also be a detector that can detect different magnetic wavelengths. With the suggested camera system, a field of view can be projected to an image sensor or plurality of image sensors, wherein the resulting total field of view is greater than or equal to a space of a hemisphere and is gapless. With the suggested camera system, gaps or overlaps when joining a large field of view of several partial fields of view can be prevented. By means of the light beams or electromagnetic beams incident on the deflection means, the suggested beam deflection arrangements allows to image or capture a gapless total field of view of greater than 90° in the three dimensional space on the image sensor.

The suggested camera system can cover a field of view of a semi-space without gaps and without overlap without extending the camera system. Further, the costs for producing such a camera system also do not significantly increase. The camera system described herein addresses a problem occurring in very specific arrangements. This relates to a camera system segmenting a total field of view into partial fields of view and images each segmented field of view in an optical channel with at least one objective allocated to the optical channel onto an image sensor. In other words, each segmented partial field of view has its own optical channel with at least one own objective. Here, it is possible that the objectives are arranged on a common substrate. The objectives can be produced, for example, by glass embossing or as a polymer molded on glass. Therefore, the objectives can be configured as monolithic array. Electromagnetic beams transmitted through an objective define an optical channel. This means that the number of objectives determines the number of optical channels. On the at least one image sensor of the suggested camera system, a rectangular area of the at least one image sensor is allocated to each optical channel. In each rectangular area, the electromagnetic beams of the allocated optical channel are detected.

Advantages of the suggested camera system can individually be seen in that there is no loss of sensor area as the beam deflection element arrangement is configured such that the entire sensor area can be used to cover a spatial area that is as large as possible. Further, the suggested camera system can be configured with the same or even smaller dimensions than already known camera systems, which contributes to less weight and/or less costs for producing the camera system.

The suggested camera system can, for example be used in vehicle cameras. Further exemplary fields where the suggested camera system can be used are robotics, machine vision (in other words machine vision by means of industrial cameras), remote detection, mobile phones, in video conference systems or also in medical applications.

BRIEF DESCRIPTION OF THE DRAWINGS

Embodiments of the present invention will be detailed subsequently referring to the appended drawings, in which:

FIGS. 3*a-h* are schematic views of camera systems (FIGS. 3*a, c, e, g*) and representation of the allocated resulting field of view in the object space (FIGS. 3*b, d, f, h*);

FIG. 6*a* is a schematic camera system, wherein the multi-apertures objective is arranged between the beam deflection element arrangement and at least one image sensor;

FIG. 6*b* is a schematic camera system, wherein the beam deflection element arrangement is arranged between the multi-aperture objective and the at least one image sensor; and FIG. 6*c* is a schematic camera system, wherein the multi-aperture objective is surrounded by one beam deflection element arrangement each on both sides.

DETAILED DESCRIPTION OF THE INVENTION

Individual aspects of the invention described herein will be described below in FIGS. 1*a* to 6*c*. In combination of FIGS. 1*a* to 6*c*, the principle of the present invention is illustrated. In the present application, the same reference numbers relate to the same or equal elements, wherein not all reference numbers are illustrated again in all drawings when the same are repeated.

In FIG. 1*a* to FIG. 4*d*, one coordinate system each in the image space (x, y, z) or in the object space ($k_1$, $k_2$) is shown, which is referred to herein for specifying the suggested camera system further with respect to the drawn axes or the resulting field of view. The coordinates x, y, z, $k_1$ and $k_2$ are each real numbers, wherein the (x, y, z) coordinate system are Cartesian coordinates and the ($k_1$, $k_2$) coordinate system are polar coordinates.

Figures 1A, 1B, 2A, 2B:
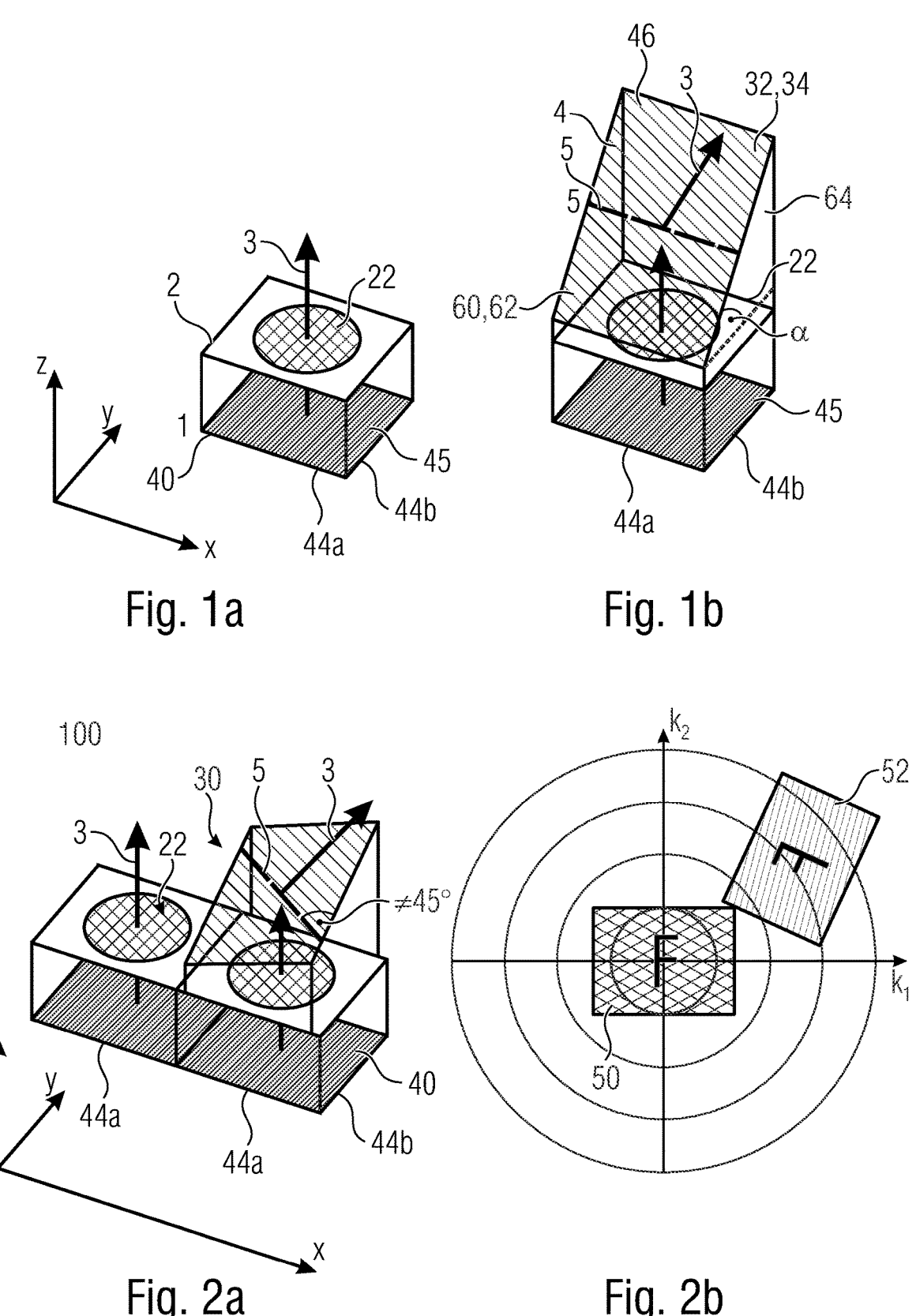
FIGS. 1*a, b* are schematic views of different examples of objectives and image sensors for forming optical channels on image sensors with different viewing directions.
FIGS. 2*a, b* is a schematic view of a camera system and representation of the allocated resulting field of view in the object space.

FIGS. 1*a* and 1*b* show schematic views of different examples of objectives 2 and image sensors 40 for forming optical channels 22 on the image sensor 40 with different viewing directions 3. FIG. 1*a* shows, for example, a rectangular image sensor 40 with an objective 2 which is arranged on or in parallel spaced apart to the image sensor 40. Reference number 3 indicates a viewing direction 3 of the image sensor 40 in FIG. 1*a*. Without beam deflection element 4, the viewing direction 3 of the image sensor 40, as shown in FIG. 1*a*, extends along a straight direction or along a z-direction, while the image sensor 40 extends along an x-y-plane as defined by a shown coordinate system. The image sensor 40 comprises an image sensor area 45, which is also rectangular. The image sensor 40 in FIGS. 1*a* and 1*b* is formed in a rectangular manner with two different side lengths 44*a*, 44*b*. It is further possible to form the image sensor 40 in a square manner. What angular area in the image space exactly is occupied by a specific optical channel can be determined by projecting back its rectangular area onto the image sensor 40 by the objective 2 and the deflection element 4 in the object space. The field of view 50, 52 itself has again the shape of a rectangle in the object space. See FIGS. 2 to 4. If this is performed for different tilting angles of the beam deflection element 4, it shows that this rectangle performs a rotation under specific circumstances. The same depends, however, on the tilting angle in the three-dimensional space in at least one plane. In other words, the rotation or displacement of the rectangle depends on the tilting axis 5 around which the beam deflection element 4 is tilted with respect to the image sensor 40. Therefore, two optical channels with different viewing directions 3 have two fields of view 50, 52 that are rotated and/or displaced to each other.

In FIG. 1*b*, a beam deflection element 4 is arranged in front of the objective 2. The beam deflection element 4 can be, for example, a mirror 34 or a prism 32. It is further possible that the beam deflection element 4 is a combination of mirror 34 and prism 32 or a combination of several mirrors 34 and prisms 32.

In FIG. 1*b*, the beam deflection element 4 has such a geometry that the beam deflection element 4 comprises, on a side facing away from the image sensor 45 or the objective 2, a beam deflection element area 46 extending away from the objective 2 at an angle α. In particular, the beam deflection element area 46 can extend away from the objective 2 at an angle α>0° or α<90°. Thus, the beam deflection element area 46 extends in the three-dimensional space and comprises variable (x, y, z) coordinates starting from a surface of the objective 2, wherein x, y and z are real numbers. The beam deflection element area 46 comprises a tilting axis 5, which runs in parallel to the x-axis at a constant z-value and a constant y-value as shown in FIG. 1*b*, i.e. (x, y=constant, z=constant). Due to the geometry of the beam deflection element 4 or the tilting axis 5 of the beam deflection element 4, beam deflection takes place. In other words, the image sensor 40 according to FIG. 1*b* has a viewing direction 3 deviating from the straight direction, namely laterally in y-direction. Thus, the image sensor 40 according to FIG. 1*b* looks laterally around the corner.

The different combinations of image sensor 40 and objective 2 and possibly beam deflection element 4 as shown in FIGS. 1*a* and 1*b* form components of the suggested camera system 100. The camera system 100 includes at least one rectangular image sensor 40, a multi-aperture objective 20 for generating an optical image and a beam deflection element arrangement 30 as can be seen, for example, in FIGS. 2*a*, 3*a*, 3*c*, 3*e*, 3*g*, 4*a* and 4*c*.

The beam deflection element arrangement 30 includes a number of beam deflection elements 4 for deflecting incident light beams. The multi-aperture objective 20 includes a plurality of objectives 2. The multi-aperture objective 20 and the beam deflection arrangement 30 are coupled to the at least one rectangular image sensor 40 to form an arrangement of optical channels 22, which are incident on the at least one image sensor 40 for capturing the optical image. An optical channel is defined as an arrangement of objective 2 and possibly beam deflection element 4. Through the optical channel 22, electromagnetic beams are incident on the image sensor 40. Electromagnetic beams are incident in each optical channel 22, which are then incident on the at least one image sensor 40 for capturing the optical image. The number of beam deflection elements 4 is arranged with respect to each other and with respect to the image sensor 40, such that each beam deflection element 4 is tilted around a tilting axis 5, wherein the tilting axis 5 runs through a beam deflection element area 46 and the tilting axis 5 runs in parallel to a side of the at least one rectangular image sensor 40 or the tilting axis 5 encloses a 45° angle with at least one side, in particular with two sides of the at least one rectangular image sensor 40, which span an image sensor area 45 of the at least one rectangular image sensor 40. As indicated, for example, in FIGS. 2 to 4, the camera system 100 includes a plurality of image sensors 40. For example, each objective 2 could be formed with a single image sensor 40. It is further possible that a single image sensor is provided or that an objective 2 is arranged on a number of image sensors Thus, the at least one image sensor 40 can be a single image sensor 40 or can consist of several image sensors 40.

Figures 3A, 3B, 3C, 3D:
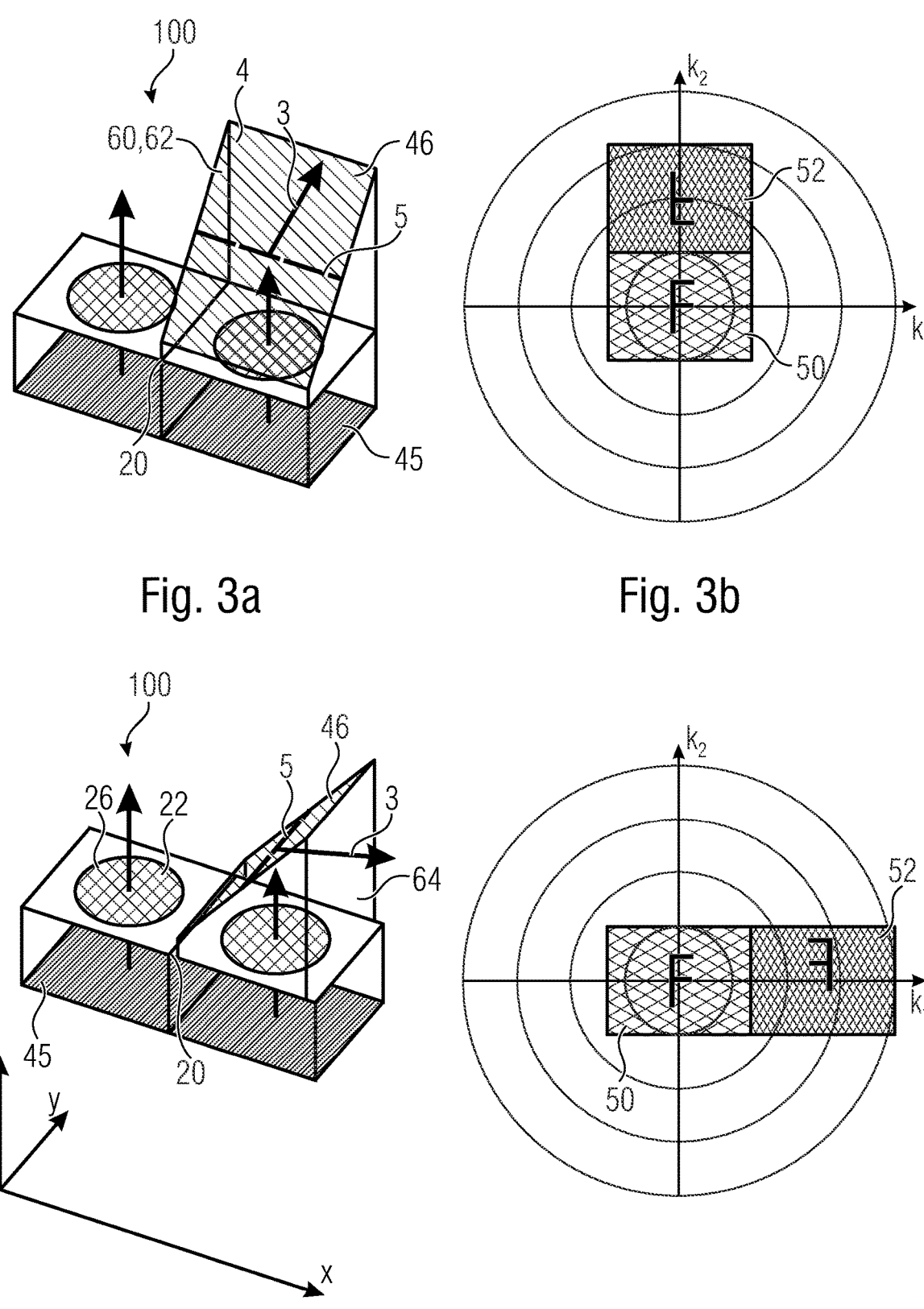

The tilting axis 5 runs in parallel, in particular spaced apart to the image sensor area 45. In other words, the tilting axis assumes a constant value on the z-axis and extends either along the x-axis or along the y-axis in parallel to one side 44 of the at least one image sensor 40 (see FIGS. 3a and 3c) or extends in the x-y-plane, such that the tilting axis 5 encloses an angle of 45° with a side length 44 of the at least one image sensor 40 (see FIG. 3e). In FIG. 3b, the partial fields of view 50, 52 are shown, which result in the objectives 2 shown in FIG. 3a with and without deflection element 4. In the respective figures, each partial field of view is the objective 2 looking straight ahead with image sensor 40 and without deflection element 4. The partial field of view 50 looking straight ahead is each shown in the origin of the object space ($k_1$, $k_2$).

The partial fields of view 52 result from an objective 2 with image sensor 40 and deflection element 4 looking into a lateral direction as described already above. For example, the partial field of view 52 of FIG. 3b is mirrored towards the top, i.e. mirrored along a $k_2$-axis and displaced along the $k_1$-axis. For example, the partial field of view 52 of FIG. 3d is mirrored to the side towards the right, i.e. mirrored along a $k_1$-axis and displaced along the $k_2$-axis. The tilting axes 5 in FIGS. 3a and 3c are each arranged in parallel to one side of the image sensor 40.

The partial field of view of FIG. 3f is, for example, rotated, mirrored and displaced in parallel to the axis in the object space, such that the partial field of view in FIG. 3f is only joined at one corner of the partial field of view 50 looking straight ahead. The tilting axis 5 in FIG. 3e runs at a 45° angle to a side of the image sensor 40.

Figures 5A, 5B:
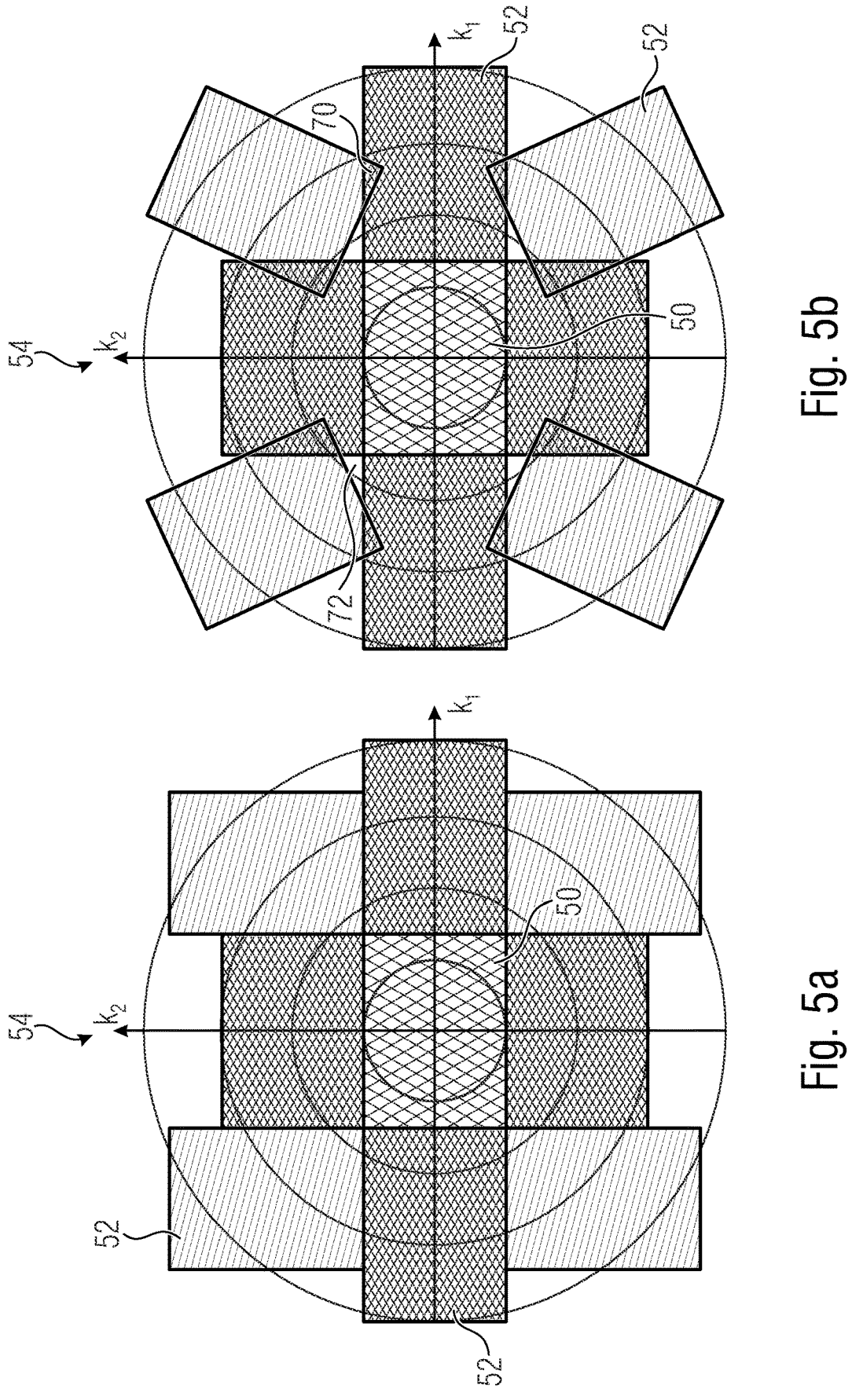
FIGS. 5*a, b* are schematic views of resulting fields of views in the object space with respective nine optical channels, wherein the optical channels in FIG. 5*a* have no gaps and no overlap and the optical channels in FIG. 5*b* have gaps and overlaps.

The partial field of view of FIG. 3h is, for example, rotated, mirrored and not displaced in parallel to the axes in the object space, such that the partial field of view in FIG. 3a results in gaps 72 and/or an overlap 70 with other partial fields of view 52 (cf. FIG. 5b). The tilting axis 5 in FIG. 3g does not run at the 45° angle to one side of the image sensor 40.

The image sensor 40 includes a rectangular image sensor area 45, which is joined such to the multi-aperture objective 20 and the beam deflection arrangement 30 that electromagnetic beams, which are incident in the allocated optical channel 22 through a deflection element 4, are incident on a rectangular area of the image sensor area. Here, light beams are incident on the multi-aperture objective 20. However, also electromagnetic beams of the non-visible range can be incident on the image sensor 40, which can also be detected. Here, therefore, light beams mean electromagnetic beams of any wavelength range. An optical channel 22 is allocated to each beam deflection element 4, through which the light beams are incident onto the image sensor 40, in particular onto a rectangular area of the image sensor 40.

The beam deflection elements 4 are mirrors 34 and/or prisms 32. Accordingly, a beam deflection element 4 can be a mirror 34 or can be a prism 32 or can be a combination of mirror 34 and prism 32. Such mirrors 34 and/or prisms 32 are schematically illustrated in FIGS. 2 to 4.

An image sensor 40 or an area of an image sensor 40, on which only objective can be arranged, can have a straight viewing direction 3 that can run along the z-axis. Each camera system 100 can comprise at least one image sensor 40 or an area of an image sensor 40 on which only one objective is arranged. However, it is also possible that the camera system 100 comprises a beam deflection element 4 with a straight direction as has been described above.

The at least one image sensor 40 comprises a number of rectangular areas, wherein each rectangular area is allocated to an optical channel 22. In other words, to each channel 22 an individual rectangular image sensor area is allocated on which the electromagnetic beams allocated to the optical channel can be collected or detected in order to capture the optical image.

A rectangular area of the number of rectangular areas or the at least one image sensor 40 can be square (not illustrated). The image sensor 40 is formed in a rectangular manner with two different side lengths 44a, 44b as shown, for example, in FIGS. 1a to 1b. In FIGS. 2a to 4c, the at least one image sensor 40 is joined into a total rectangular image sensor of several rectangular image sensors. A border of the image sensor area 45, i.e. whether the image sensor area 45 is formed in a square or rectangular manner determines a resulting border of the field of view in the object space.

Two different rectangular areas of the number of rectangular areas have different side lengths 44a and 44b. The different side lengths 44a, 44b of the image sensor 40 define differently dimensioned rectangular areas of the image sensor, which are also joined to differently dimensioned fields of view in the object space. Thereby, for example, the resolution can be improved or a greater space can be projected by an image sensor 40 with objective 2. It is possible to combine the total field of view from differently dimensioned and differently shaped partial fields of view, wherein the different fields of view can result from image sensor areas 45 with different side lengths 44a, 44b. Such proceedings can result in space savings. For example, for specific deflection angles, the mirrors may become quite large. If the mirror is cut for the respective partial image fields, a smaller field of view is projected onto the allocated objective 2. Thereby, the allocated area on the image sensor can become smaller for this deflection element 4. However, this does not mean that image information is lost. Electromagnetic beams that are not transmitted by a cut deflection element 4 can, for example, be transmitted by an adjacent deflection element 4, such that in sum, the entire image information, i.e. all electromagnetic beams can be received by the camera system. It is further possible that square image sensors 40 are combined with rectangular image sensors 40 in a camera system 100.

Each beam deflection element 4 comprises a beam deflection element area, which has the form of a parallelogram or a trapezoid or a triangle or an oval or a circle or a polygon. It is further possible that the beam deflection element area has an asymmetric circumference. It is possible to cut a mirror or a prism into a desired shape, for example, for space reasons. In particular, a deflection element 4 in a projection onto the image sensor area 45 does not have to fill the same completely. The beam deflection element 4 can also be part of the optical system of the objective, i.e. can be optically effective. Then, the optical channel 22 can be a hybrid imaging system including both refractive as well as reflective elements. Here, the mirror can have any shapes of reflective optical elements, for example, parabolic, hyperbolic or spherical. Additionally, the same can also have a different rotationally symmetric aspheric form or can have a free-form area. Further, a deflection element 4 can be configured in a segmented manner, i.e. can be combined of several areas and can possibly have bends.

FIG. 3 shows several positions of the beam deflection elements 4 and the resulting fields of view 50, 52 in the object space. If the position of a beam deflection element 4 is considered as a result of tilting the beam deflection element 4 around a tilting axis 5, it shows that the tilting axis 5 is decisive for a rotation of the field of view 52. More accurately, it is decisive how the tilting axis 5 runs with respect to the rectangular image sensor 40 or rectangular image sensor area allocated to the optical channel 22.

In FIGS. 3a and 3c, the tilting axis 5 of the beam reflection element 4 is parallel to one of the sides of the image sensor 40. The allocated partial field of view 52 is mirrored towards the top (FIG. 3b) or mirrored towards the right (FIG. 3d). A displacement towards the top or towards the right can be adjusted by an allocated tilting angle.

In FIG. 3e, the tiling axis 5 of the beam deflection element 4 encloses an angle of 45° to the sides of the image sensor 40. The resulting field of view 52 is mirrored around a 45° axis. In other words, the field of view 52 is displaced towards the left top, which can be adjusted by the tilting angle (FIG. 3f).

In FIG. 3g, the tilting axis 5 of the beam deflection element 4 encloses a different angle than 45° to the sides of the image sensor 40. The resulting field of view 52 is mirrored around an axis deviating from 45°, which results in a rotation of the field of view. This has the effect that there are overlaps 70 and gaps 70 with other fields of view 52 (see also FIG. 5b).

Figures 4A, 4B:
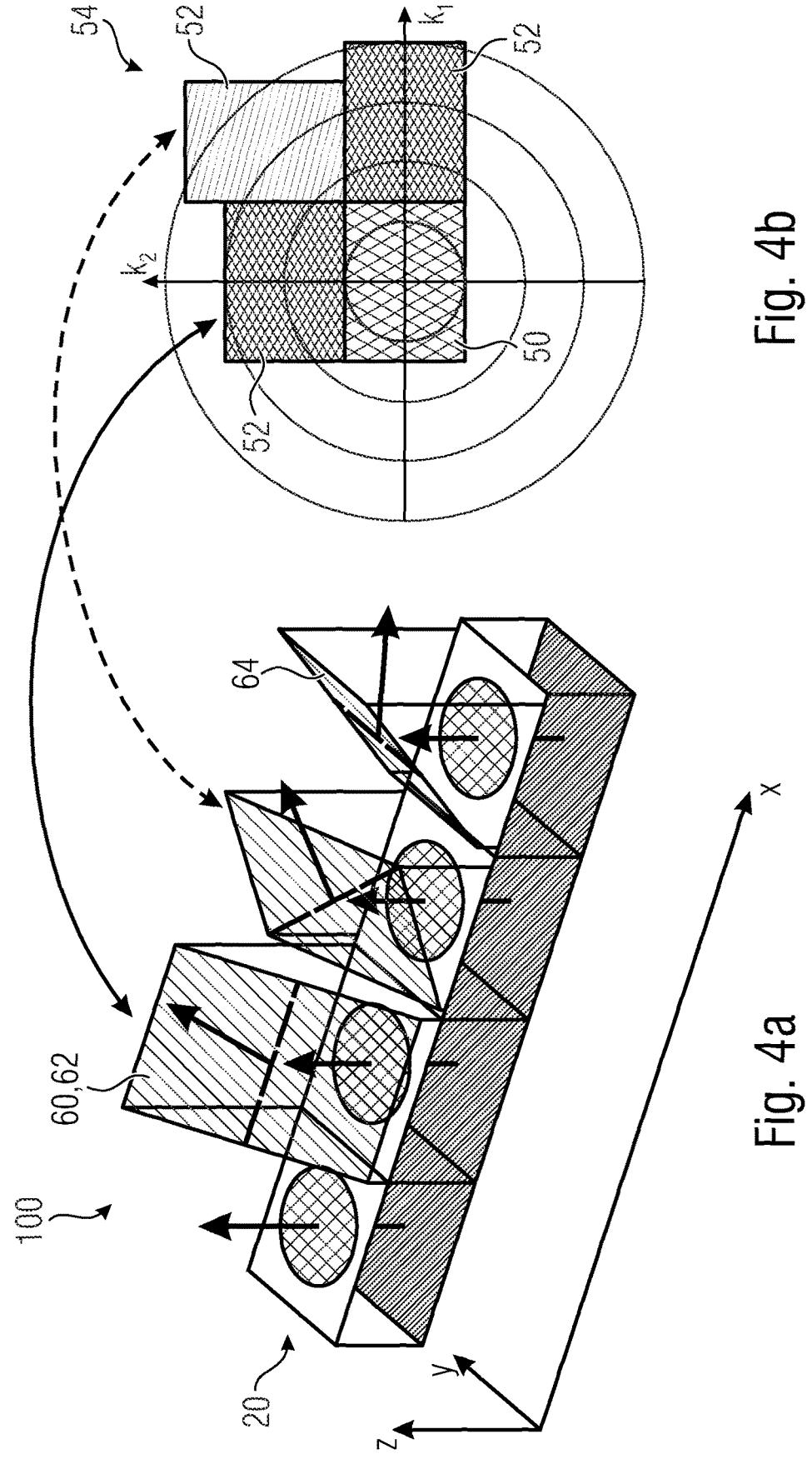
FIGS. 4*a-d* are schematic views of camera systems (FIGS. 4*a, c*) and representation of the allocated resulting field of view in the object space (FIG. 4*b, d*)
Figures 4C, 4D:
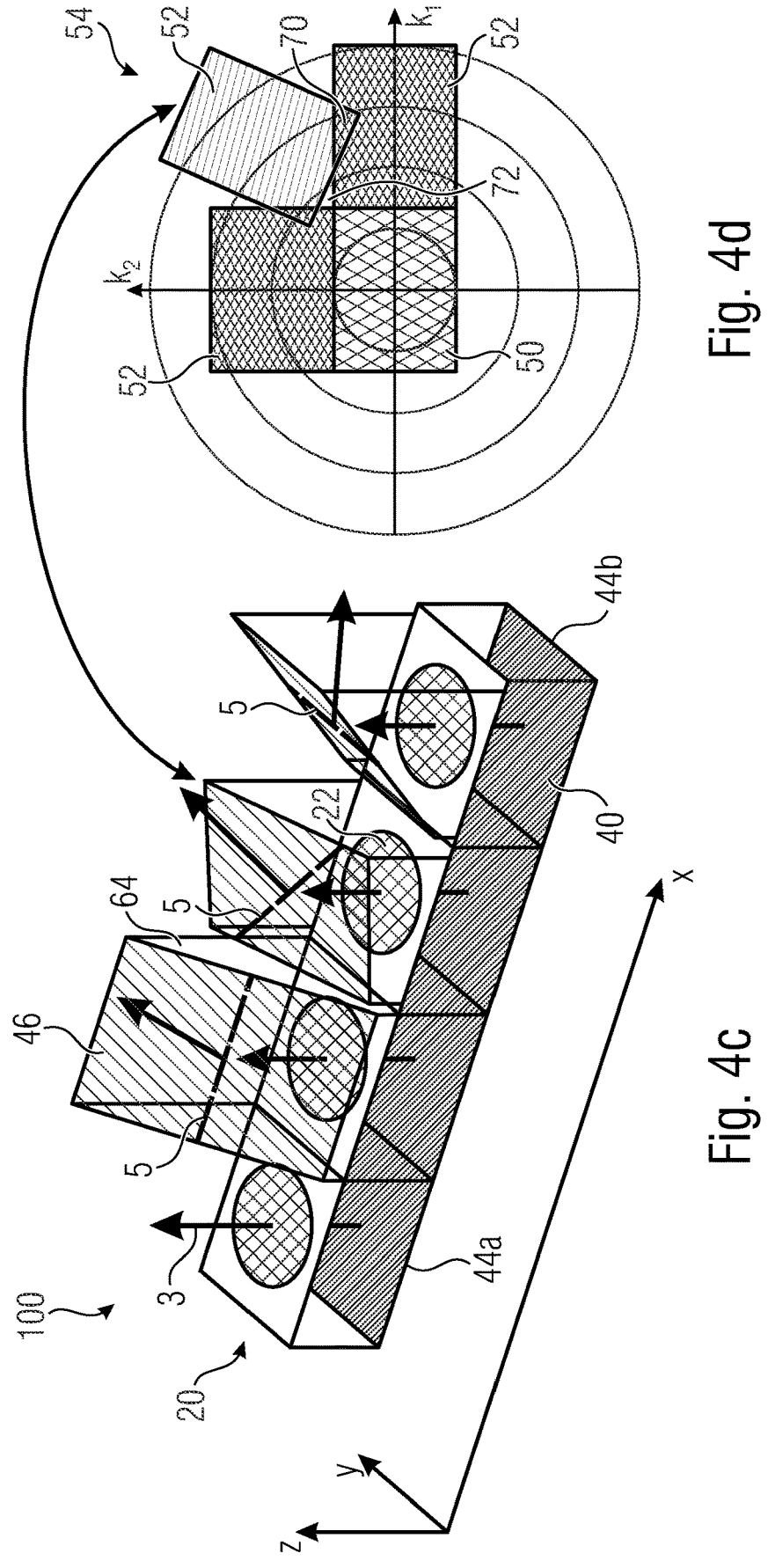

FIGS. 4a and 4c each show a camera system with four optical channels 22 and FIGS. 4b and 4d show the allocated fields of view 50, 52 in the object space. In FIG. 4a, the tilting axes 5 either run parallel or enclose an angle of 45° to the sides of the image sensor 40. A gapless field of view results (FIG. 4b). In FIG. 4d, the tilting axes 5 either run parallel or enclose an angle of 45° to the sides of the image sensor 40. A field of view with gaps 72 and overlaps 70 results (FIG. 4b).

FIG. 5a shows, for example, a gapless total field of view 54 joined of a straight field of view 50 and eight surrounding partial fields of view 52. For generating such a gapless field of view, for example, a camera system 100 as in FIG. 4a has been used, which has been extended, for example, by five further optical channels 22. The optical channels of FIG. 5a are arranged, for example, in a 3×3 matrix structure. The optical channels can generally be arranged in an m×n matrix structure, wherein m and n are natural numbers.

FIG. 5b shows a total field of view with gaps 72 and overlaps 72. For generating such a field of view with gaps 72 and overlaps 70, for example, a camera system 100 as shown in FIG. 4c has been used, which comprises a tilting axis 5 that runs neither parallel nor at a 45° angle to the sides 44 of the image sensor 40.

At least one beam deflection element 4 comprises a metallic and/or dielectric coating 60, 62. In particular, the metallic and/or dielectric coating 60, 62 is deposited on a surface 64, such as the beam deflection element area of the beam deflection element 4 in order to separate two adjacent optical channels 22 from each other and/or to allow reflections in the beam deflection element 4. Incident electromagnetic beams or light beams are reflected or deflected within the beam deflection element 4 at the metallic coating 60 or at the dielectric coating 62 according to the teaching that the angle of incidence equals the angle of reflection. Further, camera systems 100 without coating are also possible. The same can then use, e.g., a total reflection to deflect the electromagnetic beams. The beam deflection elements 4 can then be implemented either completely or partly by prisms or by mirror and prism combinations.

Therefore, at least one beam deflection element 4 is configured to implement beam deflection by means of total inner reflection.

The multi-aperture objective 20 is an objective arrangement formed of two or several objectives 2. The objective 2 of the objective arrangement are arranged side by side, in particular, an optical channel 22 is allocated to each objective 2. The number of optical channels is equal to the number of objectives 2. Here, several objectives 2 can image their optical channels onto a single image sensor 40. It is also possible that each objective 2 images its optical channel 22 to an image sensor 40 allocated to the objective or that an objective images its optical channel 22 to image sensors 40 arranged beside each other.

One objective 2 is allocated to each beam deflection element 4, wherein a beam deflection element 4 is not allocated to each objective 2, such that the number of beam deflection elements 4 is smaller than or equal to the number of objectives 2. In other words, the number of beam deflection elements 4 arranged beside each other can be smaller than or equal to the number of objectives 2. For example, FIGS. 2 to 4 each show a schematic perspective of a portion of a camera system 100. FIGS. 2 and 3 each show two objectives 2 arranged beside one another in a 1×2 matrix structure, wherein only a single beam deflection element 4 is arranged on one of the two objectives 2. This arrangement in a matrix structure also represents a possible channel allocation to the at least one image sensor 40 or a detector. In FIGS. 2 and 3, one partial field of view 50 is shown, which results by the optical channel 22 of the allocated objective 2 after detection by the at least one image sensor 40 in the object space. In FIGS. 2 to 4, one coordinate system in the object space each is shown, wherein this coordinate system has the axes $k_1$ and $k_2$. The objective 2 without beam deflection element 4 is oriented in a straight direction, i.e., along an optical axis (in z direction) perpendicular to an image sensor plane 45, which runs parallel to an x-y plane. A straight optical channel 22 of an objective 2 needs no deviation or deflection of a light beam. The objective 2 with beam deflection element 4 comprises a lateral viewing direction. In other words, with the help of the beam deflection element 4, the objective 2 can look into a specific lateral direction.

The partial field of view 50 of the objective 2 looking straight ahead is shown as in FIGS. 3 and 4 each, for example in the origin of the $k_1$-$k_2$ coordinate system. The lateral partial field of view 52 which is displaced and/or rotated and/or mirrored by the respective allocated beam deflection element 4 is adjacent to the straight field of view 50 such that, in sum, a gapless total field of view 50 can result as shown, for example, in FIG. 5a.

The objective arrangement is configured in a monolithic manner. In this context, monolithic means consisting of one piece or being integral. The lenses 26 of the objectives 2 are arranged beside each other on a common glass wafer (not illustrated). In other words, the lenses 24 are arranged in one plane. Thus, the glass wafer acts as carrier or as a substrate that can be referred to as wafer-level optics. The objectives can also consist of several lenses, then, the objective arrangement consists of several glass wafers stacked on top of each other.

FIGS. 6a, 6b and 6c each show a schematic arrangement of a camera system. FIG. 6a shows a camera system, wherein the multi-aperture objective 22 is arranged between the beam deflection element arrangement 30 and at least one image sensor 40. The multi-aperture objective 20 and the beam deflection arrangement 30 are arranged with respect to each other such that the multi-aperture objective 20 is located between the beam deflection arrangement 30 and the at least one image sensor 40.

FIG. 6b shows a camera system 100, wherein the beam deflection element arrangement 30 is arranged between the multi-aperture objective 20 and the at least one image sensor 40. FIG. 6c shows a camera system 100 wherein the multi-aperture objective 20 is surrounded on both sides by one beam deflection element arrangement 30 each. According to an embodiment, the camera system comprises two beam deflection arrangements 30, wherein the beam deflection arrangements 30 surround the multi-aperture objective 20 on both sides and wherein one of the two beam deflection arrangements 30 is arranged on the at least one image sensor 40.

Several pixels of the at least one image sensor 40 are allocated to each objective 2 of the multi-aperture objective 20. In other words, the objectives 2 shown in FIGS. 1 to 4 are each connected to an image sensor 40, such that an optical channel 22 of an objective 24 leads to a number of pixels of the image sensor 40.

The objectives 2 of the multi-aperture objective arrangement 20 are arranged beside each other. In the same way, the beam deflection elements 4 are arranged beside each other as shown in FIGS. 2 to 4. In other words, both the beam deflection element arrangement 30 as well as the objective arrangement extend each above or behind one another along the z direction. Here, the beam deflection element arrangement 30 and the object arrangement each extend in parallel to an x-y plane.

The camera system 100 comprises several, in particular 2, 4, 6, 9 or 15, optical channels. In particular, the number of objectives 2 predetermines the number of optical channels 22. In FIG. 4, for example, four optical channels 22 can be seen. The optical channels are arranged in matrix shape. In FIG. 4, four channels are arranged in 1×4 matrix structure. Accordingly, the objectives 2 or the sensors 40 are arranged in a matrix structure.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus. In particular, this is the case when a focusing mechanism and/or an image sensor are operated or even interact with each other.

In the preceding detailed description, various features have been grouped together in examples in part to streamline the disclosure. This type of disclosure should not be interpreted as intending that the claimed examples have more features than are explicitly stated in each claim. Rather, as the following claims reflect, subject matter may be found in fewer than all of the features of a single disclosed example. Consequently, the following claims are hereby incorporated into the detailed description, and each claim may stand as its own separate example. While each claim may stand as its own separate example, it should be noted that although dependent claims in the claims refer back to a specific combination with one or more other claims, other examples also include a combination of dependent claims with the subject matter of any other dependent claim or a combination of any feature with other dependent or independent claims. Such combinations are encompassed unless it is stated that a specific combination is not intended. It is further intended that a combination of features of a claim with any other independent claim is also encompassed, even if that claim is not directly dependent on the independent claim.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCE NUMBER LIST 2 objective
3 viewing direction
4 beam deflection element
5 tilting axis
20 multi-aperture objective
22 optical channel
26 lens
30 beam deflection arrangement
32 prism
34 mirror
40 image sensor
44a side length
44b side length
45 image sensor area
46 beam deflection element area
50 straight field of view
52 lateral field of view
54 total field of view
60 metallic coating
62 dielectric coating
64 surface
70 overlap
72 gap
100 camera system

The invention claimed is:

1. A camera system, comprising:
at least one rectangular image sensor,
a multi-aperture objective for generating an optical image and
a beam deflection element arrangement comprising a number of beam deflection elements for deflecting incident light beams,
wherein the multi-aperture objective and the beam deflection element arrangement are coupled to the at least one rectangular image sensor to form an arrangement of optical channels, which are incident on the at least one rectangular image sensor for capturing the optical image,
wherein the number of beam deflection elements are arranged with respect to each other and with respect to the at least one rectangular image sensor such that each beam deflection element is tilted around a tilting axis, wherein the tilting axis runs through a beam deflection element area and the tilting axis runs in parallel to one side of the at least one rectangular image sensor or the tilting axis encloses a 45° angle with at least one side of two sides of the at least one rectangular image sensor,
wherein two optical channels comprise different viewing directions and therefore two partial fields of view that are rotated and/or displaced with respect to each other, and
wherein a total field of view segmented into partial fields of view is imaged without gaps and without overlaps on the at least one rectangular image sensor.

2. The camera system according to claim 1, wherein the tilting axis runs in parallel, in particular spaced apart, to an image sensor area.

3. The camera system according to claim 1, wherein the image sensor comprises a rectangular image sensor area that is connected to the multi-aperture objective and the beam deflection element arrangement such that light beams that are incident in an allocated optical channel by a deflection element are incident on a rectangular area of the image sensor area.

4. The camera system according to claim 1, wherein the beam deflection elements are mirrors or prisms.

5. The camera system according to claim 1, wherein the at least one rectangular image sensor comprises a number of rectangular areas, wherein each rectangular area is allocated to an optical channel.

6. The camera system according to claim 5, wherein two different rectangular areas of the number of rectangular areas comprise different side lengths.

7. The camera system according to claim 1, wherein a beam deflection element comprises a beam deflection element area, which comprises a shape of a parallelogram, a trapezoid, a triangle, an oval, a circle or a polygon.

8. The camera system according to claim 1, wherein at least one beam deflection element comprises a metallic coating or a dielectric coating, and wherein the metallic coating or the dielectric coating is deposited on a surface of the at least one beam deflection element to separate two adjacent optical channels from each other or to allow reflections in the at least one beam deflection element.

9. The camera system according to claim 1, wherein at least one beam deflection element is configured to implement a beam deflection by means of total inner reflection.

10. The camera system according to claim 1, wherein the multi-aperture objective is an objective arrangement formed of two or more objectives, wherein the two or more objectives in the objective arrangement are arranged beside each other, in particular, an optical channel is allocated to each objective.

11. The camera system according to claim 1, wherein an objective is allocated to each beam deflection element, wherein a beam deflection element is not allocated to each objective, such that the number of beam deflection elements is smaller than or equal to a number of objectives.

12. The camera system according to claim 10, wherein the objective arrangement is configured in a monolithic manner or wherein lenses of the each objective are arranged beside each other on a common glass wafer.

13. The camera system according to claim 1, wherein the multi-aperture objective and the beam deflection element arrangement are arranged with respect to one another such that the multi-aperture objective is located between the beam deflection element arrangement and the at least one rectangular image sensor.

14. The camera system according to claim 1, wherein the beam deflection element arrangement is arranged at the multi-aperture objective such that the beam deflection element arrangement is located between the multi-aperture objective and the at least one rectangular image sensor.

15. The camera system according to claim 1 comprising two beam deflection arrangements, wherein the two beam deflection arrangements surround the multi-aperture objective on both sides, and wherein one of the two beam deflection arrangements is attached to the at least one rectangular image sensor.

16. The camera system according to claim 1, wherein several pixels of the at least one rectangular image sensor are allocated to each objective of the multi-aperture objective.

17. The camera system according to claim 1, wherein the camera system comprises several, in particular four, six, nine or fifteen optical channels.

18. The camera system according to claim 1, wherein one partial field of view of the partial fields of view results by an objective without deflection element and another partial field of view of the partial fields of view, which looks in a lateral viewing direction, results by an objective and a deflection element with image sensor.

19. The camera system according to claim 1, wherein a partial field of view of the partial fields of view, which is given by an objective without deflection element defines a straight field of view.

20. The camera system according to claim 19, wherein a lateral partial field of view, which is displaced, rotated or mirrored by a respective associated beam deflection element, respectively borders on the straight field of view such that, in sum, a gapless total field of view results.

21. The camera system according to claim 1, wherein a separate optical channel with at least one separate objective belongs to each partial field of view.

22. The camera system according to claim 1, wherein gaps or overlaps are prevented when joining a total field of view of several partial fields of view.

23. A camera system, comprising:
at least one rectangular image sensor,
a multi-aperture objective for generating an optical image and
a beam deflection element arrangement comprising a number of beam deflection elements for deflecting incident light beams,
wherein the multi-aperture objective and the beam deflection element arrangement are coupled to the at least one rectangular image sensor to form an arrangement of optical channels, which are incident on the at least one rectangular image sensor for capturing the optical image,
wherein two optical channels comprise different viewing directions and therefore two fields of view that are rotated and/or displaced with respect to each other,
wherein one partial field of view of the partial fields of view results from an objective without deflection element and another partial field of view of the partial fields of view looking into a lateral viewing direction from an objective and a deflection element with image sensor,
wherein the number of beam deflection elements is arranged with respect to each other and with respect to the at least one rectangular image sensor such that each beam deflection element is tilted around a tilting axis, and
wherein the tilting axis runs through a beam deflection element area and the tilting axis runs in parallel to one side of the at least one rectangular image sensor or the tilting axis encloses a 45° angle with at least one side of two sides of the least one rectangular image sensor, such that gaps and overlaps are prevented when joining a large total field of view from several partial fields of view.

* * * * *